May 12, 1959

R. L. SCOTT 2,886,173

EGG PROCESSING PLANT

Filed Dec. 15, 1955

INVENTOR.
Roy L. Scott
BY Robert K. Youtie
ATTORNEY

May 12, 1959

R. L. SCOTT 2,886,173

EGG PROCESSING PLANT

Filed Dec. 15, 1955

INVENTOR.
Roy L. Scott
BY
Robert K. Youtie
ATTORNEY

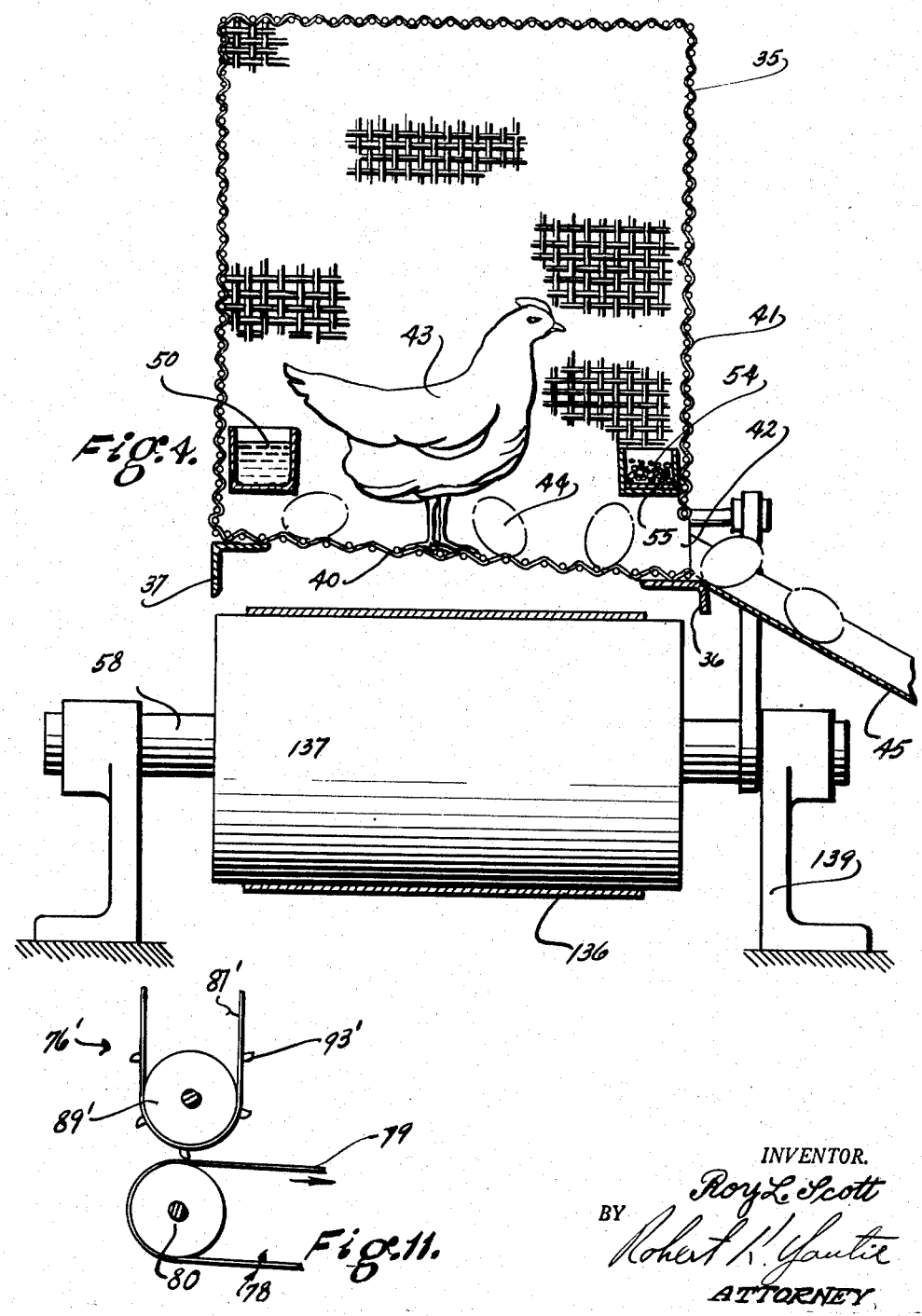

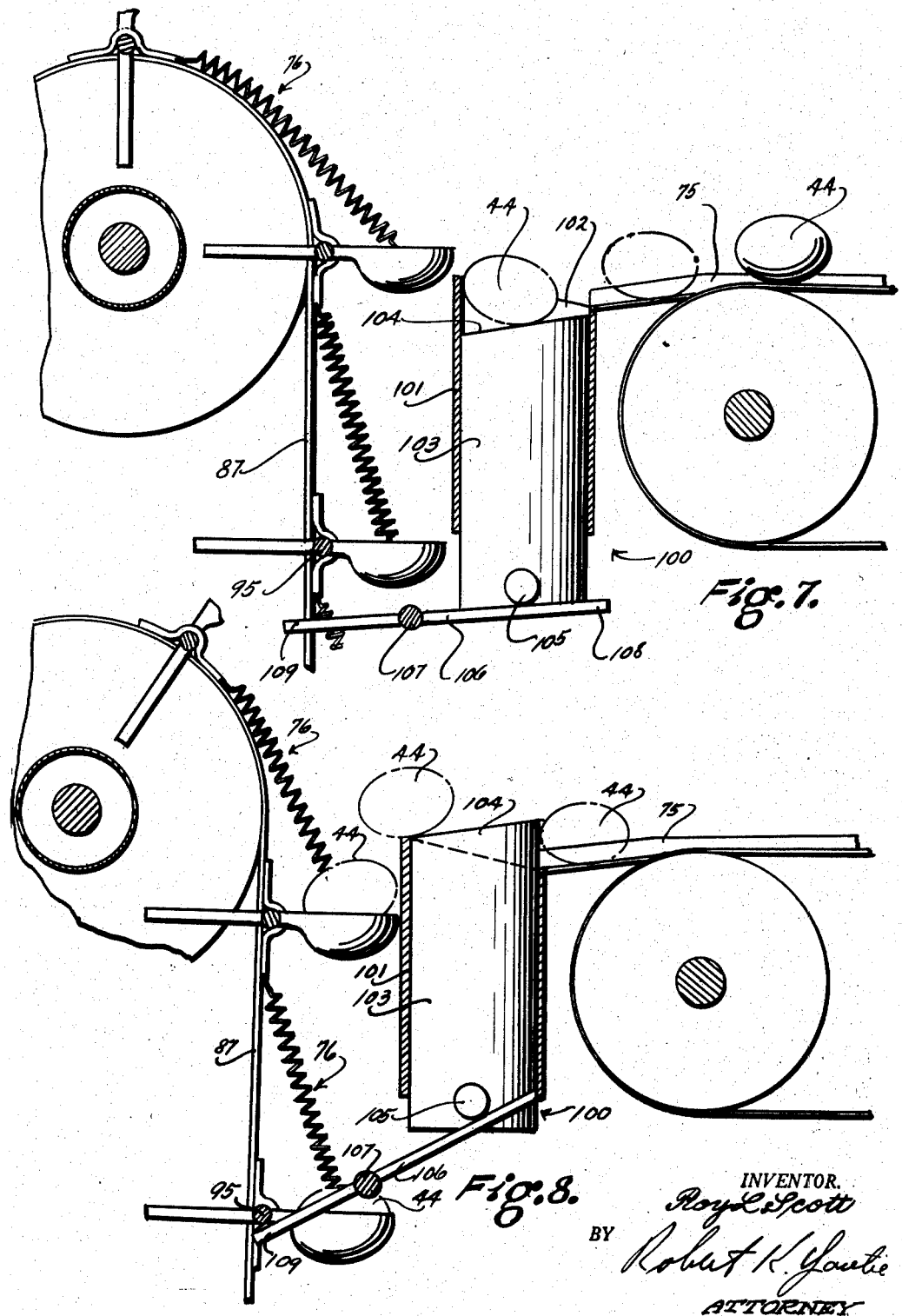

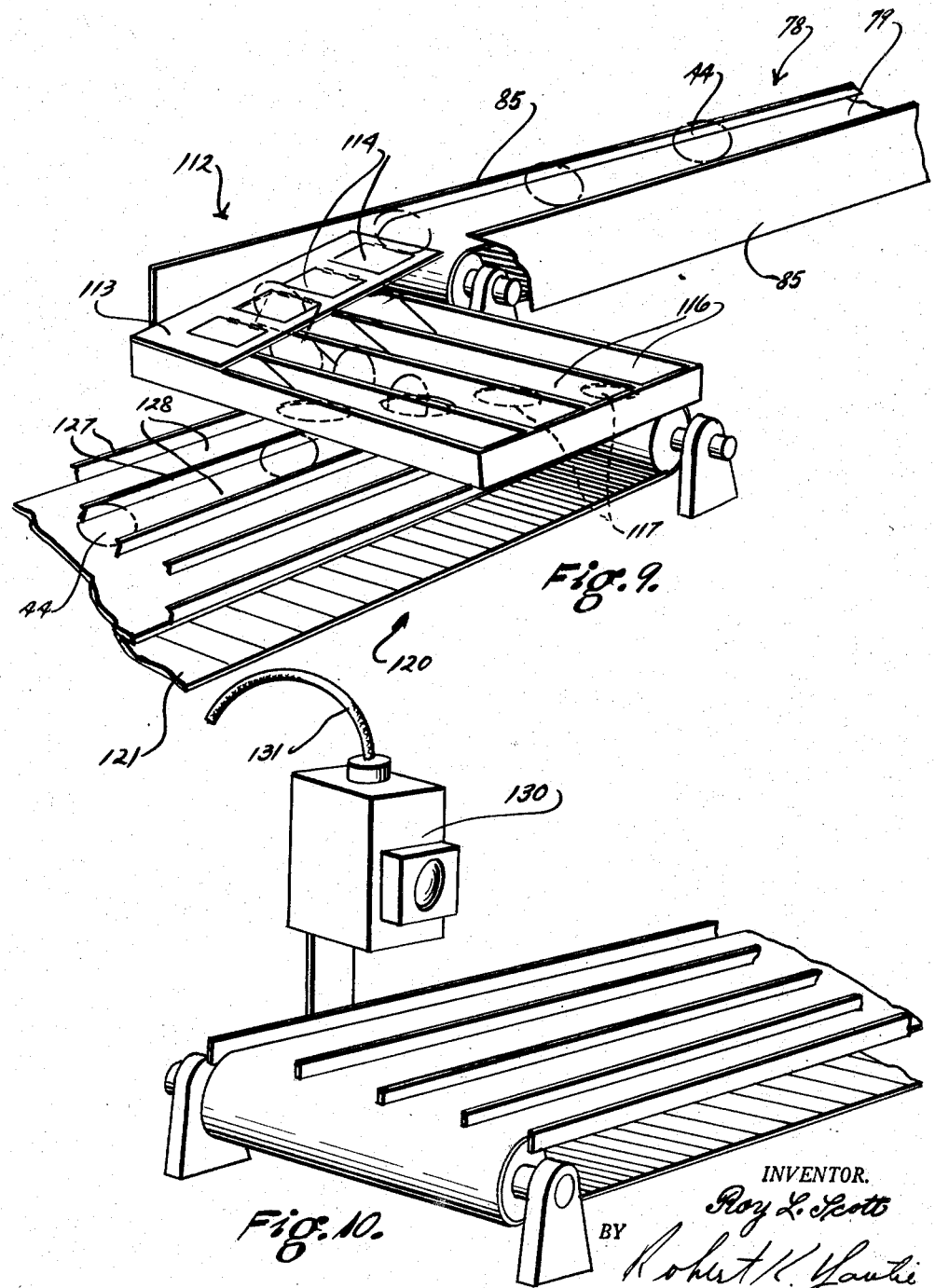

United States Patent Office 2,886,173
Patented May 12, 1959

2,886,173

EGG PROCESSING PLANT

Roy L. Scott, Penndel, Pa.

Application December 15, 1955, Serial No. 553,322

2 Claims. (Cl. 209—121)

This invention relates to a new and improved means for processing eggs.

As is well known to those versed in the art, eggs are presently individually and manually gathered or collected in buckets or the like, and subsequently packed and transported to an inspection and grading center. Here the eggs must be manually unpacked for inspection and grading, and repacked for trucking to a processing plant. The eggs are then again unpacked, candled, otherwise processed, and repacked for distribution to the retail store. All of this, of course, involves considerable handling of the eggs, both in cases as well as the bare eggs, and involves considerable expense in labor, packaging materials, and in damaged eggs. Further, the above described procedure is extremely time consuming, during which the eggs are subjected to numerous temperature changes tending to produce spoilage.

It is therefore a general object of the present invention to provide an egg processing plant or apparatus which eliminates or substantially reduces much of the above described procedure, and which assures delivery of full, firm and fresh eggs at their best taste, to the point of consumer purchase, rapidly, economically, and without loss of egg quality.

It is a more particular object of the present invention to provide egg processing apparatus which eliminates manual gathering of the eggs at the farm, minimizes subsequent handling of the eggs, and eliminates much of the heretofore necessary labor and materials involved in packing. Specifically, by the structure of the instant invention, the eggs are not manually handled at all before candling, and may be initially packaged at the farm for purchase by the consumer.

It is still another object of the present invention to provide an apparatus or plant wherein eggs are substantially completely automatically processed from the nest or cage of the hen to the consumer carton. Further, the apparatus of the present invention is adapted to occupy relatively little space, preferably within the laying house.

It is a further object of the present invention to provide an egg processing plant having the advantageous characteristics mentioned in the foregoing paragraphs, which is simple in construction and operation, and which can be economically manufactured and maintained.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Figure 4 is an enlarged, transverse sectional view of Figure 2 showing in greater detail a cage for housing a hen, and the associated structure;

Figure 5 is a partial, elevational view showing the lower region of an egg conveying elevator of the present invention;

Figure 6 is a partial elevational view showing an upper region of the egg conveying elevator;

Figure 7 is an elevational view, partly in section and greatly enlarged, showing the egg conveying elevator and illustrating one position of its operation;

Figure 8 is an elevational view similar to Figure 7 and showing another position of the elevator operation;

Figure 9 is a partial, perspective view showing an egg grader adapted for use in conjunction with the present invention;

Figure 10 is a partial perspective view showing an egg candling station adapted to be employed in the apparatus of the instant invention; and Figure 11 is a partial elevational view showing a slightly modified form of egg conveying elevator constructed in accordance with the present invention.

Figure 1:
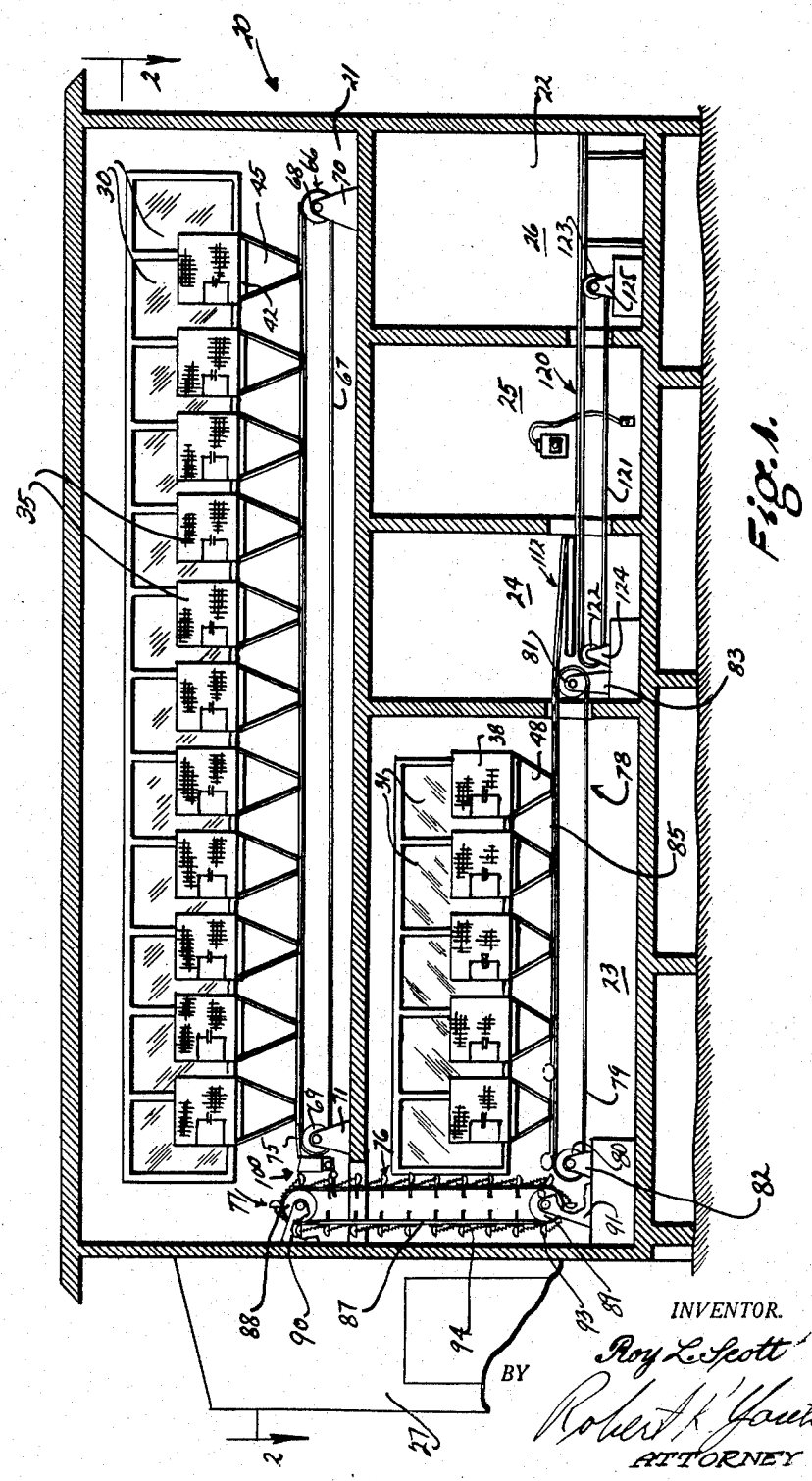
Figure 1 is a sectional elevational view showing an egg processing plant constructed in accordance with the present invention.

Referring now more particularly to the drawings, and specifically to Figure 1 thereof, the egg processing plant of the present invention is preferably housed in a single building structure, generally designated 20, which may have one or more stories or levels, two being shown in the drawing for purposes of illustration. The building structure 20 has an upper undivided story or level 21 forming a single room, and a lower level or story 22 subdivided into a row or series of rooms 23, 24, 25 and 26. In addition, a wing or extension 27, approximately one and a half stories in height, is provided on one end of the building structure 20 adjacent to the lower floor room 23. The single room of the upper floor 21 and the room 23 of the lower floor are both intended to be occupied by laying hens and may be provided in their side walls with windows 30 and 31 affording the hens light and air.

Figure 3:
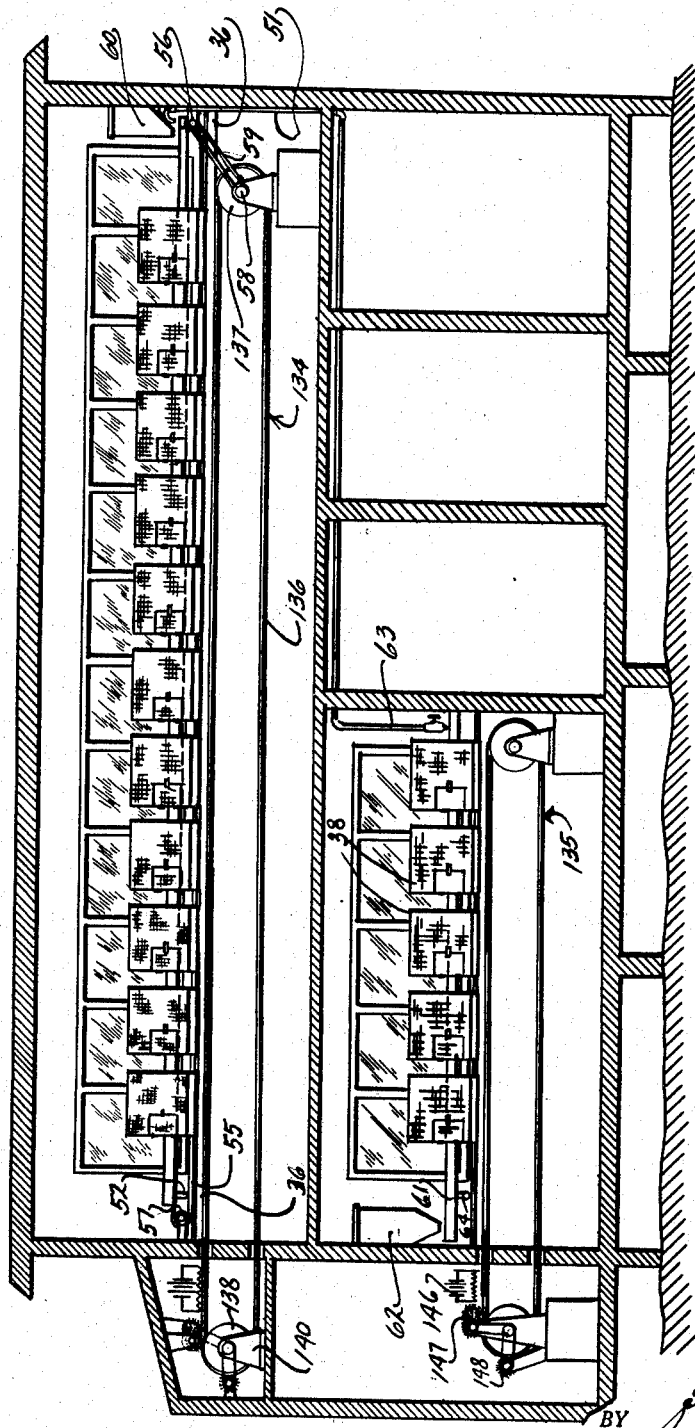
Figure 3 is a vertical sectional view taken substantially along the line 3—3 of Figure 2.

A generally horizontally aligned row or series of hen cages 35 are supported in elevated relation above the floor of the upper story 21, as by generally horizontally extending fixed angle irons or supporting members 36 and 37, see Figures 3 and 4. A generally horizontally disposed aligned series or row of similar hen cages 38 are supported, by any suitable means, within the lower story room 23 spaced above the floor of the latter room.

As all of the hen cages 35 and 38 may be substantially identical, a detailed illustration and description of one, as in Figure 4, will suffice. The hen cages may be of generally box-like configuration and fabricated of wire screening or other suitably reticulated material. It will be noted that the lower or bottom wall 40 of the cage 35 declines in one direction, say forwardly as illustrated; and, that the front cage wall 41 has its lower region open, as at 42. Hence, as the hen 43 lays eggs 44, the eggs will roll by gravity forwardly along the bottom wall 40 of the cage 35 toward the front wall opening 42. A trough, chute or channel, as at 45 in Figure 4, is associated with each of the hen cages, and is fixedly supported with one end adjacent to the front cage opening 42 for receiving eggs passing forwards through the latter opening. More particularly, among each trough or channel 45 declines forwardly from its respective cage opening 42, and converges or tapers toward its lower end to define a chute for delivering eggs from the respective cage. The cages 38 are substantially identical to the cages 35 and provided respectively with forwarding descending delivery chutes or troughs 48 substantially identical to the delivery chutes 45, see Figure 1.

Figure 2:
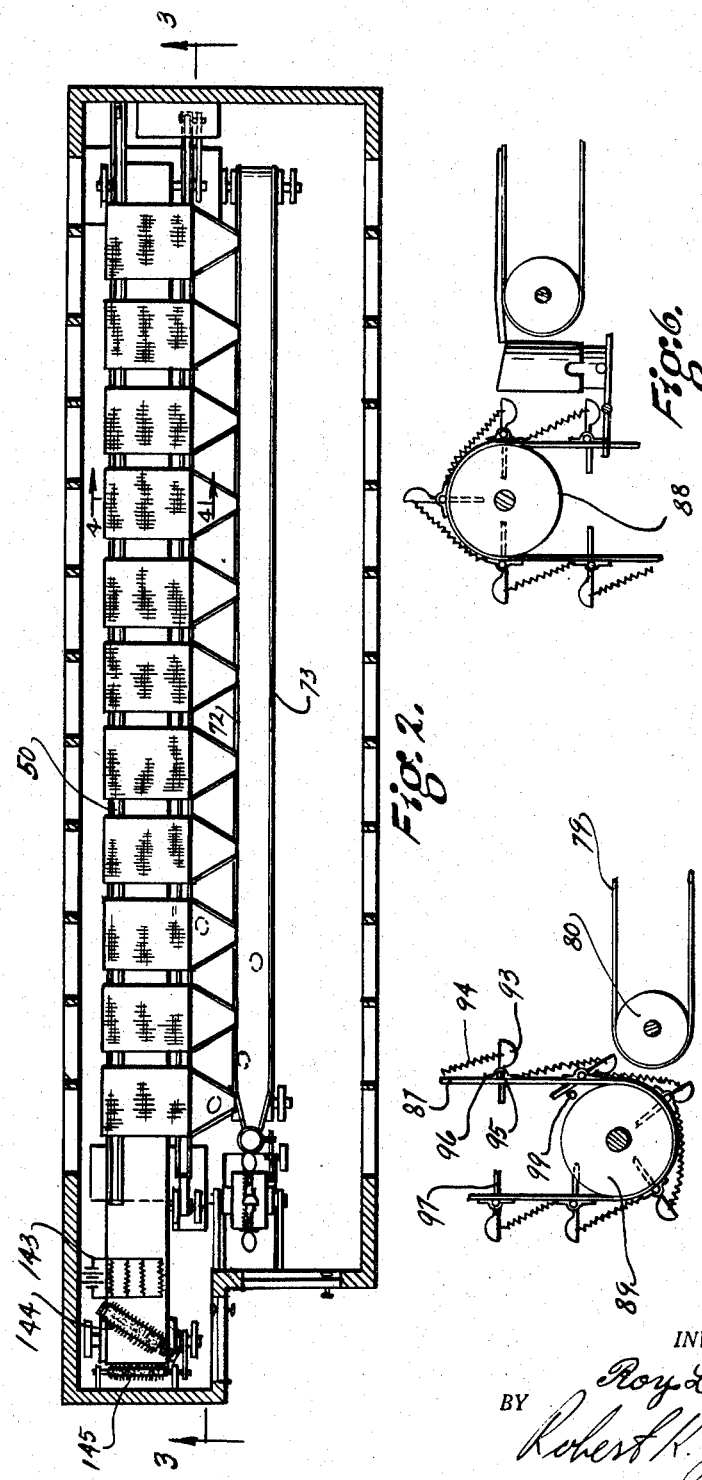
Figure 2 is a generally horizontal, sectional view taken substantially along the line 2—2 of Figure 1.

As best seen in Figures 2 and 4, a generally horizontally disposed water trough 50 extends through the rearward region of each cage 35, while a water supply pipe 51 and suitable water drainage means 52 are provided at opposite ends of the water trough to maintain a desired level in the latter. Extending generally horizontally through all of the hen cages 35, in the front regions thereof, is a generally horizontally disposed feed trough or channel 54. An endless belt or other suitable conveyor means 55 has its upper stretch received in and movable along the bottom wall of the feed trough 54 for conveying food to all of the cages 35. More specifically, the endless belt 55 extends about and is supported by rollers 56 and 57 mounted in the building 20 adjacent to opposite ends of the feed trough 54. The roller 56 is driven from a drive shaft 58 through a belt 59; and, a hopper 60 is supported on one wall of the upper story room 21 in position to drop desired quantities of feed onto the belt 55 for movement in the trough 54 to the cages 35.

The cages 38 in the lower level or first story room 23 are also preferably provided with a generally horizontally disposed feed trough or channel 61, a hopper 62 for delivering feed to the trough, a water trough (obscured in Figure 3 behind the feed trough) and a water supply pipe 63 and drain 64, which may be connected to the supply pipe 51 and drain 52 if desired.

Extending past the lower, discharging end of the several delivery chutes 45 is a generally horizontally disposed conveyor 66. The conveyor 66 is shown as mounted on the floor of the upper building level 21 and may be of any suitable construction for receiving and carrying away eggs from the delivery chutes 45. The illustrated conveyor 66 includes an endless belt 67 extending about and rotatably supported by a pair of generally parallel, horizontally spaced rolls 68 and 69. The rollers 68 and 69 are respectively journaled in upstanding pedestals 70 and 71; and, suitable drive means (not shown) is operably connected to at least one of the rollers to effect counterclockwise rotation of the belt 67 as seen in Figure 1. Along the upper stretch of the belt 67, which is arranged to receive eggs from the delivery chutes 45, there may be provided on opposite sides of the belt a pair of longitudinally extending guide rails 72 and 73 to maintain the eggs on the upper belt stretch. If desired, the upper belt stretch may be transversely concave; or, other suitable means may be provided to insure discharge of all the eggs from the left-hand end of the belt, as shown in the drawings.

Extending from the discharge end of the conveyor 66, the left-hand end as seen in the drawings, is a converging channel 75 for delivering eggs from the conveyor to a transfer mechanism 77, which includes an elevator 76 and an elevator loader 100 and carries eggs from the upper to the lower story of the building structure 20.

An additional, horizontally disposed conveyor, generally designated 78, is mounted in the lower level room 23 and arranged with one end in position to receive eggs from the transfer mechanism 77 and convey the eggs into the adjacent lower level room 24. In addition, the conveyor 78 extends past the lower, discharge ends of the delivery chutes 48 for receiving eggs from the latter chutes and carrying the received eggs into room 24. The conveyor 78 may be of any suitable construction, such as that illustrated, including an endless belt 79 trained over a pair of generally horizontally spaced rollers 80 and 81, which are respectively located adjacent to the lower end of the transfer mechanism 77 and interiorly of the lower level room 24, and journaled in bearing pedestals 82 and 83. Suitable drive means (not shown) is connected to one of the rollers 80, 81 for effecting clockwise rotation of the belt 79, so that eggs deposited on the upper stretch of the belt will be carried into the room 24. As described in connection with the conveyor 66, the upper stretch of the conveyor belt 79 may be provided along its opposite sides with a pair of longitudinally extending guide rails 85, only one being shown in Figure 1, to prevent lateral displacement and falling of eggs from the sides of the belt 79.

The elevator 76 of the transfer means 77 includes an endless, split belt 87 trained about a pair of generally horizontally disposed, vertically spaced rollers 88 and 89, the former being journaled by bearing brackets 90 in the upper level room 21, and the latter being journaled by bearing brackets 91 in the lower level room 23. A plurality of buckets or cups 93 are pivoted to the split belt 87 at spaced points there along, and each resiliently biased by a tension spring 94 toward a limiting position of its pivotal movement generally normal to the supporting belt 87. More specifically, as seen in Figures 5 and 6, each of the cups 93 is pivotally connected to the belt 87, as by a pivot pin 95 and journal strap 96, and includes a stem or extension 97 extending from the respective cup inwards beyond and generally normal to the adjacent belt portion. In addition to the belt 87 being split, the rollers or pulleys 88 and 89 are also split or peripherally grooved to receive the cup extension arms 97, as shown in dashed outline in Figures 5 and 6. In Figure 5 it will be noted that a fixed lug or pin 99 is located adjacent to the lower elevator roller 89 in position to successively engage the extension arms 97 of the cups 93 and tilt or pivot the latter about the pins 96 against the force of the associated spring 94 for depositing eggs on the conveyor belt 79. Suitable drive means (not shown) is operably connected to one of the rollers 88, 89 to effect clockwise rotation of the belt 87.

The loader 100 is associated with the elevator 76 and serves to receive eggs from the discharge end of the conveyor 66 and individually place the eggs in respective cups 93. As best seen in Figures 7 and 8, the loader 100 includes a generally vertical tube or cylinder 101, fixedly supported by any suitable means (not shown), which has its upper end open and located adjacent to the relatively narrow exit end of the channel 75 for individually receiving eggs from the latter. In addition, the cylinder or tube 101 has its upper end edge 102 cut at an angle so as to incline away from the channel 75. A vertically disposed plunger or lift 103 is mounted for limited up and down sliding movement in the cylinder 101 and has its upper end surface 104 disposed at an angle declining away from the channel or ramp 75. The lower end region of the lift member or plunger 103 extends downwards beyond the lower end of the cylinder 101 and is provided with an outstanding lug or stud 105. A lever 106 is arranged between the elevator 76 and loader 100 and is pivotally supported intermediate its end by a pin or rod 107 and any suitable bearing means (not shown). The lever has oppositely extending arms 108 and 109, the former lever arm extending toward the loader 100 for engagement beneath the stud 105, and the latter lever arm 101 extending into the split belt for engagement with successive cup supporting pins 95.

With the elevator belt 87 rotating in the clockwise direction, and the conveyor belt 67 rotating in the counterclockwise direction, eggs, as at 44, will be fed from the latter conveyor belt and roll or slide through the channel 75 into the upper region of the loader cylinder 100, these successive egg positions being shown in dot-and-dash outline. That is, the loader lift 103 is normally in its lowered or lowermost position of Figure 7 and thus combines with the upper edge region of the cylinder 101 to define a receptacle for receiving and holding a single egg. As each of the cup pivot pins 95 passes downwards it will engage with the lever arm 109 to depress the latter pivotally about the lever pin 107. The lever arm 108 will thus be swung upwards in engagement with the stud 105 to raise the plunger 103 to the position illustrated in Figure 8. As illustrated therein, the particular egg resting on the slanted upper end of the plunger 103 will be elevated beyond the cylinder edge 102, and thus roll or slide into a waiting cup or bucket 93. That is, the cups 93 are so spaced apart that when the pivot pin 95 of one cup engages with the lever 106 to effect sufficient elevation of the plunger 103 to discharge an egg from the loader 100, another cup, say the next adjacent upper cup will be in position to receive the discharged egg.

When each successive cup pivot pin 95 moves past and releases the lever arm 106, the loader plunger 103 is released for free downward movement to its lowermost position of Figure 7 for repetition of the above described procedure.

The bucket springs 94 are of sufficient strength to retain the buckets in their limiting, outstanding position, with the eggs received therein, upon movement along the downward stretch of the elevator belt 87. However, as seen in Figure 5, the stem 97 of each successive bucket as it approaches the lower roller 89 is engaged by the fixed pin or rod 99 to swing the respective buckets downwards and drop an egg on the conveyor belt 79.

The conveyor 78 thus carries all of the eggs into the preferably refrigerated egg grading room 24 and delivers the eggs to an automatic grader, generally designated 112, which may be of any suitable construction. One such grader is shown for purposes of illustration in Figure 9, and includes an inclined plate or ramp 113 arranged to receive eggs 44 from the delivery end of the conveyor belt 79, and declining away from the latter to permit rolling movement of the eggs along the ramp. The ramp 113 is provided with a series of doors 114, which may be spring biased into their closed position, or otherwise constructed so as to open downwards under the weight of a particular grade egg. That is, as the eggs roll downwards on the ramp 113, one of the doors 114 will open, corresponding to the weight or grade of the egg, and thus permit passage of the eggs through the ramps. Arranged below and extending transversely of the ramp 113 are a plurality of channels or troughs 116, each having one end located directly below one of the ramp doors 114 for receiving eggs passing through the respective ramp door. A series of relatively offset holes or openings 117 are formed in the bottom walls of the channels 116 to permit passage therethrough of the eggs received in the channels.

A generally horizontally disposed conveyor 120 extends from the egg grader 112 in room 24, through the candling room 25 and into the packing room 26, see Figure 1. The conveyor 120 may include an endless belt 121 extending about and supported by generally horizontally disposed rollers 122 and 123 journaled, respectively, by pedestal bearings 124 and 125 located in the rooms 24 and 26. Any suitable drive means (not shown) may be employed to effect rotation of the belt 121 in the clockwise direction, as seen in Figure 1.

In Figure 9 it will be observed that the conveyor 120 is arranged below and extends transversely of the egg distributing channels 116. Further, a plurality of parallel spaced guide rails 127 are fixedly arranged extending longitudinally along the upper stretch of the belt 121 to divide the latter into a plurality of longitudinal lanes 128 each of which is located under the hole 117 of a respective channel 116. Hence, eggs will be delivered from each of the distributing channels 116 to a respective lane 128 according to their weight.

The eggs thus graded move along the upper stretch of the conveyor belt 121 in their respective lanes 128 into the preferably refrigerated candling room 25. An electric candling lamp 130, having a power supply cord 131 is mounted in the candling room 25 adjacent to the upper stretch of the belt 121. This enables an operator to readily candle the previously graded eggs as they pass through the candling room on the conveyor 120. The previously graded eggs, and the eggs passed by the candling personnel are then transferred by the conveyor 120 into the preferably refrigerated packing room 26, where the completely graded and candled eggs may be packaged for consumer purchase.

Another feature of the present invention is the provision of waste conveyors, generally designated 134 and 135, and extending respectively beneath the hen cages 35 and 38 for receiving and carrying away waste from the cages.

More particularly, the conveyor 134 may be of the endless belt type, including a belt 136 extending about rollers 237 and 138 located respectively in the second story room 21 and the upper region of the building extension 27. The roller 137 is journaled in upstanding bearings 139 remote from the building extension 27, while the roller 138 is journaled in bearings 140 within the building extension so that the belt 136 extends generally horizontally beneath all of the cages 35 and into the building extension. Waste material from the several cages 35 will drop through the reticulated bottom wall 40 of each cage onto the upper stretch of the conveyor belt 136; and, as the drive shaft 58 rotates counterclockwise, as seen in Figure 3, the belt 136 serves to carry the waste material into the building wing 27.

Suitable cleaning means may be provided in the building wing 27 for removing waste material from the belt 136, such as an electrically operated drying heater located in proximity with the belt, and rotary brushes 144 and 145 arranged for brushing engagement with the belt.

The waste conveyor 135 in the lower building level is substantially identical to the waste conveyor 134 and extends beneath the hen cages 38 and into the lower region of the building extension 27 for carrying waste into the building wing. Further, a drying heater 146 and brushes 147 and 148 are mounted in the lower region of the building wing to dry waste material on the conveyor 135 and brush the waste material from the conveyor.

A slightly modified form of elevator 76' is illustrated in Figure 11, wherein a belt 87' is provided with a plurality of outstanding buckets or cups 93' which may be fixed to the belt for movement therewith about the lower roller or pulley 89' and an upper roller or pulley (not shown). In this modification the lower pulley 89' may be located directly over the roller 80 of the conveyor 78 and deliver eggs to the belt 79 without tilting or other movement of the egg buckets 93' relative to the belt 87'. That is, as the buckets 93' pass beneath the lower elevator roller 89' they will be inverted and thus drop their respective eggs on the upper stretch of the belt 79.

From the foregoing, it is seen that the present invention provides an egg processing plant which fully accomplishes its intended objects and is well adapted to meet practical conditions of operation.

Although the present invention has been described in some detail by way of illustration and example for purposes of clarity of understanding, it is understood that certain changes and modifications may be made within the spirit of the invention and scope of the appended claims. For example, the egg processing plant of this invention may be located on a single level, and thereby obviate the need for transfer means 77.

What is claimed is:

1. In an egg processing plant, a plurality of cages adapted to house laying hens, delivery means associated with each of said cages for delivering eggs exteriorly of said cages, conveyor means extending past said delivery means for receiving and carrying away eggs from said delivery means, an automatic egg grader located to receive eggs from said conveyor means, a second conveyor means arranged to receive and carry away graded eggs from said grader, an egg-candling station located along said second conveyor means, an egg-packing station located along said second conveyor means behind said egg-candling station in the direction of egg movement along said second conveyor means, a third conveyor means extending below said cages for receiving and carrying away waste from said cages, means for removing the waste from said third conveyor means, said cages being located at different levels, said first conveyor means comprising a generally horizontally disposed endless belt associated with each group of cages for receiving and carrying away eggs from the delivery means of the associated group of cages, and transfer means for collecting eggs from all but one of said belts and depositing the collected eggs on said one belt, said transfer means comprising a bucket elevator adapted to receive in its buckets eggs from the discharge regions of said all but one belt and deposit the received eggs on the loading region of said one belt.

2. An egg processing plant according to claim 1, said bucket elevator comprising an endless belt having generally vertically disposed stretches and mounted for rotation about vertically spaced horizontal axes, a plurality of egg-receiving buckets normally projecting outward from spaced points along said belt and mounted on the latter for movement therewith and independent rotation relative thereto about horizontal axes, said buckets opening upward in their normal outstanding relation for receiving eggs from said all but one belt, and abutment means located adjacent to said one belt to successively engage with and independently swing said buckets about their respective horizontal axes for depositing the eggs on said one belt.

References Cited in the file of this patent

UNITED STATES PATENTS

| | | |
|---|---|---|
| 1,946,980 | Loomis | Feb. 13, 1934 |
| 2,068,566 | Olson et al. | Jan. 19, 1937 |
| 2,264,156 | Apple | Nov. 25, 1941 |
| 2,314,344 | Cornell | Mar. 23, 1943 |
| 2,710,682 | Coll | June 14, 1955 |
| 2,745,379 | Schmidt | May 15, 1956 |

UNITED STATES PATENT AND TRADEMARK OFFICE
CERTIFICATE OF CORRRECTION

PATENT NO. : 5,886,173
DATED : March 23, 1999
INVENTOR(S) : Gregory W. Hemmi, et al.

It is certified that error appears in the above-identified patent and that said Letters Patent is hereby corrected as shown below:

On the title page, item 56 add the following:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 5 | 0 | 5 | 1 | 5 | 2 | 3 | 09/24/91 | Peter et al. | | | |
| | | 5 | 5 | 9 | 9 | 9 | 2 | 3 | 02/04/97 | Sessler et al. | | | |
| | | 5 | 2 | 5 | 2 | 7 | 2 | 0 | 10/12/93 | Sessler et al. | | | |
| | | 5 | 6 | 9 | 6 | 2 | 4 | 0 | 12/09/97 | Vallarino et al. | | | |
| | | 5 | 3 | 7 | 3 | 0 | 9 | 3 | 12/13/94 | Vallarino et al. | | | |
| | | | | | | | | | | | | | |

OTHER DOCUMENTS (Including Author, Title, Date, Pertinent Pages, Etc.)

International Search Report

Signed and Sealed this

Nineteenth Day of October, 1999

*Attest:*

Q. TODD DICKINSON

*Attesting Officer*  *Acting Commissioner of Patents and Trademarks*